April 9, 1946.　　　J. A. OBERMAIER　　　2,397,975
CARRYING CASE
Filed April 10, 1943
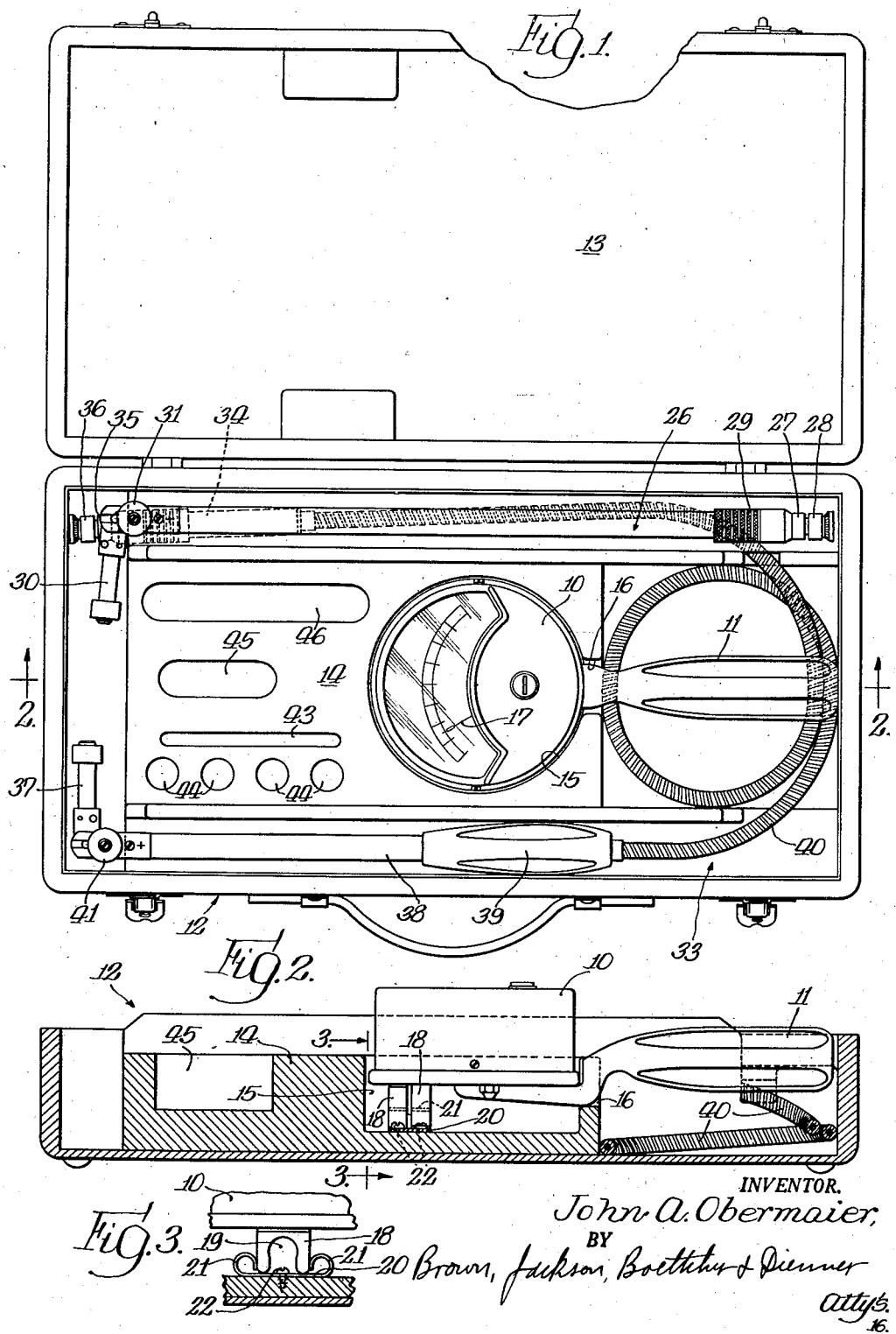
INVENTOR.
John A. Obermaier,
BY
Brown, Jackson, Boettcher & Dienner
attys.

Patented Apr. 9, 1946

2,397,975

UNITED STATES PATENT OFFICE 2,397,975

CARRYING CASE

John A. Obermaier, River Forest, Ill.

Application April 10, 1943, Serial No. 482,631

2 Claims. (Cl. 171—34)

My invention relates, generally, to electrical measuring apparatus and it has particular relation to pyrometers and carrying cases for the same.

A pyrometer of the type and character of the present invention is a precision instrument although it is intended to be used commercially outside of the laboratory. That is, it is intended for use in industrial plants in any locations where it is desired to measure the temperature of machines, parts of machines, material being processed and the like.

It is desirable to provide carrying means for such an instrument which will safeguard it and protect it so that its calibration will remain substantially unchanged.

An object of the invention is to provide for carrying a pyrometer including a measuring instrument of the D'Arsonval type and for maintaining the coil of the instrument short circuited while it is being carried so as to dampen its vibration.

Another object of the invention is to provide flexible means for interconnecting a thermocouple and the measuring instrument both mechanically and electrically so as to permit independent movement of the thermo-couple with respect to the measuring instrument to a limited extent.

Other objects of the invention will, in part, be obvious and in part appear hereinafter.

For a more complete understanding of the nature and scope of my invention, reference may be had to the following description taken, together with the accompanying drawing, in which:

Figure 1 is a top plan view of the pyrometer of the present invention shown in a carrying case with the cover open;

Figure 2 is a detail sectional view taken along the line 2—2 of Figure 1, the extension arms, shown in Figure 1, being omitted; and Figure 3 is a detail sectional view taken along the line 3—3 of Figure 2.

Referring now particularly to Figures 1 and 2 of the drawing it will be observed that the reference character 10 designates a measuring instrument which is preferably of the D'Arsonval moving coil type. The instrument 10 is provided with a handle 11 which is suitably constructed to facilitate its being grasped firmly in the hand.

When not in use the instrument 10 is arranged to be mounted in a carrying case, shown generally at 12. The carrying case 12 includes a cover 13 which is suitably hinged to the lower portion of the case 12. The carrying case 12 is provided with a centrally located raised portion 14 having a cylindrical opening 15 therein for receiving the instrument 10, as shown. A partition of the raised portion 14 is provided with a slotted opening 16 through which the handle 11 extends. The instrument 10 and handle 11 fit fairly closely in the cylindrical opening 15 and slot 16 so that, when the cover 13 is closed, the instrument 10 is held fairly tightly in position and is not free to move to any great extent.

It is highly desirable to prevent vibration of the pointer 17 of the instrument 10 so that its accuracy will remain substantially unimpaired. For this purpose means are provided for short circuiting the operating coil of the instrument 10, which causes the pointer 17 to move across the scale, at all times that the instrument 10 is in the position shown in the drawing in the carrying case 12.

At the rear of the instrument 10 there are provided two terminal blocks 18, one for each terminal of the coil of the instrument 10. These terminal blocks 18 are provided to make connections with certain extensions which connect to the thermo-couple that will be described hereinafter. For this purpose each of the terminal blocks 18 is provided with a centrally located U-shaped portion 19, as shown more clearly in Figure 3 of the drawing.

With a view to short circuiting the terminal blocks 18 and thereby the coil of the instrument 10, a short circuiting clip 20 of suitable conducting material is provided. As shown in Figure 3 of the drawing, the clip 20 is generally U-shaped and is provided with inturned resilient end portions 21 for making good contact engagement with the ends of the terminal blocks 18. Screws 22 are provided for holding the terminal clip 20 to the bottom of the carrying case 12.

It will now be apparent that, when the instrument 10 is placed in the carrying case 12 in the position shown in Figures 1 and 2 of the drawings, the terminal blocks 18 will at the same time engage the short circuiting clip 20. As a result the pointer 17 of the instrument 10 will have its tendency to vibrate dampened because the coil of the instrument 10 is short circuited. Not only does the clip 20 short circuit the terminal blocks 18 but also, since the terminal blocks 18 are resiliently gripped by the inturned end portions 21, the instrument 10 is further held securely in place in the case 12.

In order to use the instrument 10 for measuring the temperature of a part of a machine or portion of material being processed the instrument 10 is removed from the case 12. It is turned upside down so as to facilitate attachment thereto of an extension, shown generally at 26, which normally is carried in the case 12 in the position shown in Figure 1 of the drawing. This form of extension 26 is rigid and is provided with terminals 27 and 28, which are adapted to engage the terminal blocks 18 of the instrument 10. The terminal 27 is provided with a knurled extension 29 which is threadedly mounted on the extension 26, as is more fully set forth in my copending application Serial No. 482,632, filed April 10, 1943. As set forth in my copending application, the terminals 27 and 28 are arranged to interfit in the U-shaped portion 19 of each of the terminal blocks 18 and, by turning the knurled portion 29 the terminals 27, 28 are securely clamped to the terminal blocks 18.

At the opposite end of the extension 26 there is provided a thermo-couple 30 which may be any one of several designs depending upon the use to which it is to be put and the temperature that is to be measured. It will be understood that the thermo-couple 30 can be rotated with respect to the rigid portion of the extension 26 through a considerable arc and that it may be held in any desired position in this arc by a clamp nut 31.

Another form of extension for connection to the instrument 10 is shown generally at 33. This extension 33 includes a connecting arm 34 which is shown by broken lines as being located underneath the extension 26 in the case 12. The connecting arm 34 is provided with terminals 35 and 36 which are identical with the terminals 27 and 28 previously described. The terminals 35 and 36 can be connected to the terminal blocks 18 in the U-shaped openings 19 therein as will be readily understood.

A thermo-couple 37 is mounted at one end of the rigid arm 38 which has a handle grip portion 39 adapted to be grasped by the hand of the operator. Interconnecting the connecting arm 34 and handle portion 39 is a flexible conduit 40 within which are located conductors for interconnecting the thermo-couple 37 with the terminals 35 and 36 as will be readily understood. Thus the instrument 10 and the thermo-couple 37 are both electrically and mechanically interconnected by flexible means through the use of the flexible conduit 40 and the flexible conductors therein.

It will be understood that the thermo-couple 37 can be swung through a suitable arc with reference to the extension 38 to adapt it for various measuring positions. Thermo-couple 37 can be held in place by means of a clamp nut 41.

The slot 43 in the central raised portion 14 is provided for receiving a calibrating thermometer. This is employed for setting the pointer 17 of the instrument 10 at the temperature on the scale corresponding to the ambient temperature.

Recesses 44, 45 and 46 are provided in the raised portion 14 of the carrying case 12 for receiving various types of thermo-couples which are adapted to be interchangeably received by the extension arms 26 and 38.

Since certain changes can be made in the foregoing construction and different embodiments of the invention can be made without departing from the spirit and scope thereof, it is intended that all matters shown in the accompanying drawing and described hereinbefore shall be interpreted as illustrative and not in a limiting sense.

I claim as my invention:

1. A carrying case for removably receiving a portable instrument having an indicator provided with a moving coil, a pointer, and a pair of external terminal blocks connected to said coil and projecting from said instrument; said case having therein a recess substantially conforming to the instrument adapted to receive and restrain it against appreciable transverse movement in the case and a contact clip disposed and adapted to engage and short circuit the terminal blocks of an instrument in said recess while also restraining the instrument against transverse movement in said case, the latter having a cover disposed when in closed position to restrain the instrument against upward movement in said recess.

2. A carrying case for removably receiving a portable instrument having an indicator provided with a moving coil, a pointer, and a pair of rearwardly projecting external terminal blocks connected to said coil; said case having therein a recess substantially conforming to the instrument and an upwardly opening substantially U-shaped spring contact clip at the bottom of said recess disposed and adapted to receive the terminal blocks of an instrument placed therein with its rearward wall downward, said recess and said clip in cooperation restraining the instrument against objectionable transverse movement in the case and short circuiting said terminals, the case having a cover disposed when in closed position to restrain the instrument against upward movement in said recess.

JOHN A. OBERMAIER.